Dec. 1, 1953  C. W. OTT  2,661,444
DEVICE FOR VISUAL TRAINING
Filed March 21, 1951  2 Sheets-Sheet 1
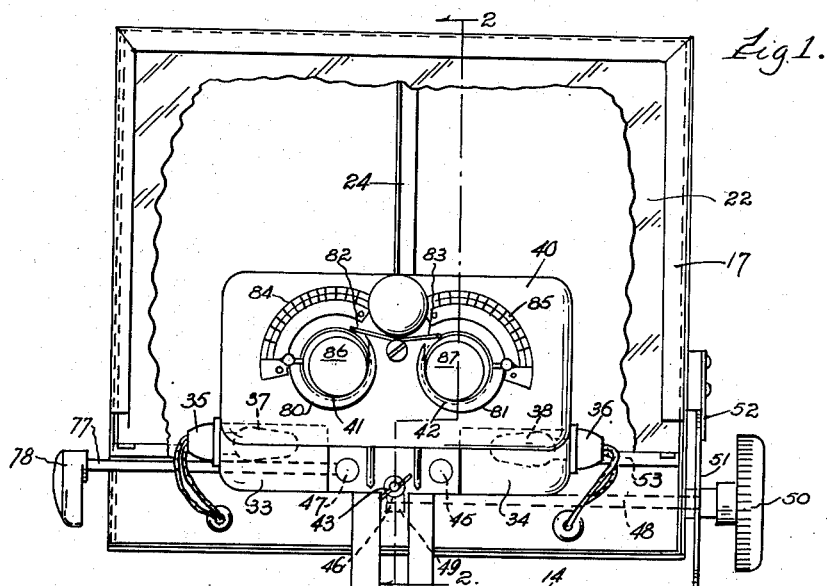
Inventor.
Charles W. Ott.
Attorneys.

Dec. 1, 1953 C. W. OTT 2,661,444
DEVICE FOR VISUAL TRAINING
Filed March 21, 1951 2 Sheets-Sheet 2
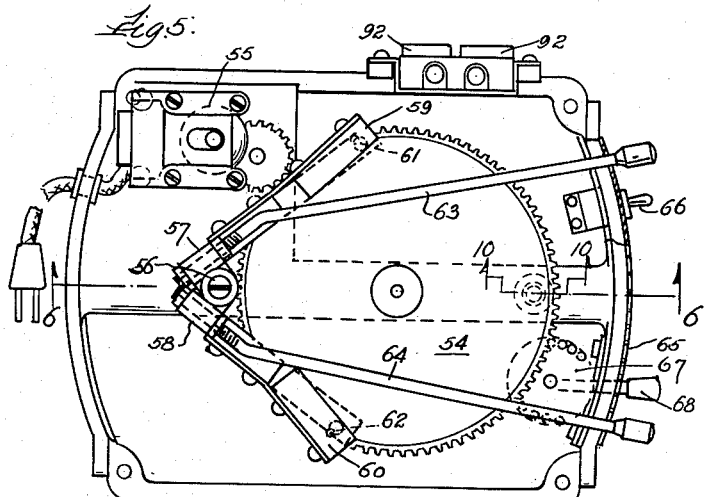
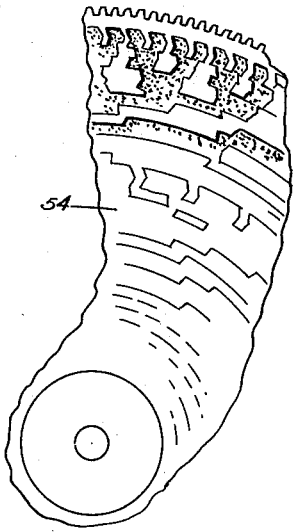
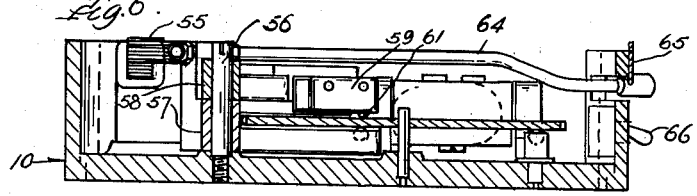
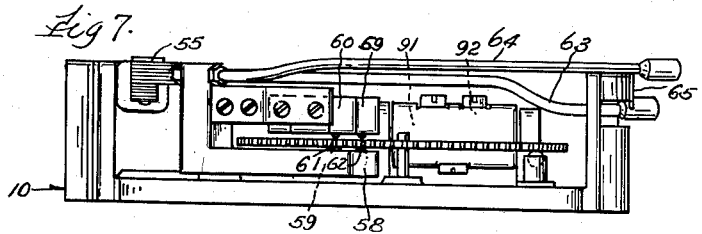
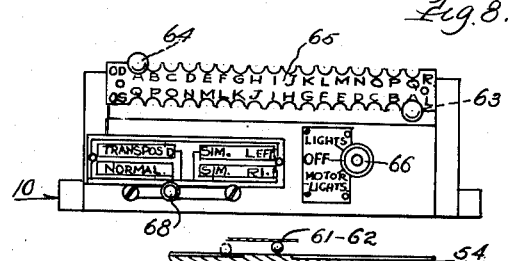
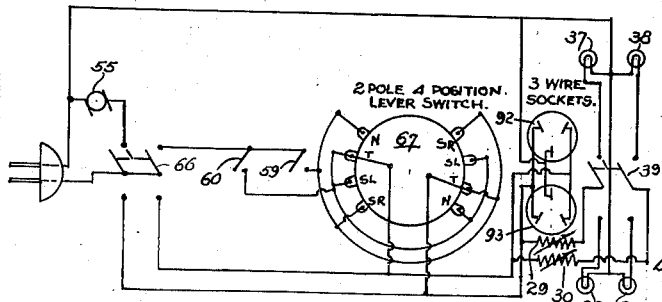
Inventor.
Charles W. Ott.
Attorneys.

Patented Dec. 1, 1953

2,661,444

UNITED STATES PATENT OFFICE 2,661,444

DEVICE FOR VISUAL TRAINING

Charles W. Ott, Maywood, Ill.

Application March 21, 1951, Serial No. 216,780

3 Claims. (Cl. 315—316)

My invention relates to a stereoscopic device for use by optometrists in visual training for the treatment and correction of defects of vision of the human eyes.

Among the objects of my invention is to provide such a single device which is capable of being used to perform all of the current visual training techniques.

At the present time, each form of training requires a special and separate instrument, so that the purchase of all of the necessary instruments is beyond the financial reach of the average optometrist.

It is a further object of my invention to provide such a device having a timing control which is capable of producing a wide variety of sequences of lighting, including all of those currently used in visual training. Another object of my invention is to provide such a device having lenses which may be used with all types of stereographic targets, regardless of their orthophoric separation.

My invention also comprises such other objects, advantages and capabilities as will later more fully appear in which are inherently possessed by my invention.

While I have shown in the accompanying drawings a preferred embodiment of my invention, yet it is to be understood that the same is susceptible of modification and change without departing from the spirit of my invention.

Referring to the drawings, Fig. 1 is a front elevational view of my complete device; Fig. 2 is a detailed sectional view of the upper portion of my device taken on line 2—2 of Fig. 1; Fig. 3 is a side view of one of my lenses; Fig. 4 is a front view of one of my lenses; Fig. 5 is a top plan view of the timing control mechanism of my device; Fig. 6 is a detailed sectional view of the same taken on line 6—6 of Fig. 5; Fig. 7 is a front elevational view of the timing control mechanism of my device; Fig. 8 is a side elevational view of the timing mechanism controls of my device; Fig. 9 is an enlarged fragmentary top plan view of a portion of my timing control plate; Fig. 10 is a detailed sectional view of the mounting of my timing control plate and switches; and Fig. 11 is an electrical wiring diagram of my device.

A preferred embodiment of my invention comprises a base 10, which is substantially rectangular in shape. Fitted over base 10 is a U-shaped pedestal 11. Extending upwardly from the top of pedestal 11 at each end thereof is a pair of upright members 12 and 13. A mounting bracket 14 is pivotally attached to upright members 12 and 13 by a pair of bolts 15 and 16.

A large hollow box 17 is attached to mounting bracket 14 by a bolt 18. Box 17 has closed sides, top and bottom. The lower portion of the front of box 17 is closed and the upper portion is open.

The angle of box 17 with respect to base 10 may be controlled by pivoting box 17 on bolts 15 and 16. Box 17 may be held at the desired angle by a manually operated lock control 19. Lock control 19 comprises a knurled hand member 20 and a screw threaded shaft 21, which extends through a screw threaded opening in upright member 12 and contacts the side of mounting bracket 14. When box 17 is in the position desired, lock control 19 may be tightened by turning hand member 20 in a clockwise direction so that the end of shaft 21 bears firmly against the side of mounting bracket 14 and prevents any movement thereof.

Mounted across the open upper portion of the front of box 17 is a plate of translucent or diffusion glass 22. A horizontal septum 23 extends across substantially the entire bottom of the inside of box 17, on a line perpendicular to the bottom edge of glass 22. Attached to the center of horizontal septum 23 is a vertical septum 24, which extends from horizontal septum 23 to the top of box 17. The inside of box 17 is thus divided into two separate compartments which are equal in size. The walls of these compartments are preferably colored white to reflect light.

Mounted on vertical septum 24 is a pair of electrical light sockets 25 and 26, in which are mounted electric light bulbs 27 and 28, providing a separate light for each compartment of box 17. Light bulbs 27 and 28 are preferably 25 watt bulbs.

Mounted in the bottom of box 17 adjacent one end thereof are two rheostats 29 and 30, which are electrically wired to control the amount of voltage applied to light bulbs 27 and 28 and thus control the intensity of their light. Rheostats 29 and 30 have hand control members 31 and 32, which are positioned on the outside of box 17 for easy manual control.

Positioned adjacent the front of box 17 and adjacent the lower edge of glass 22 are two light holders 33 and 34. Mounted within light holders 33 and 34 are electric light sockets 35 and 36, which hold light bulbs 37 and 38. Light bulbs 37 and 38 are preferably 10 watt bulbs. Light holders 33 and 34 are opaque except at the top, so that they direct the light from bulbs 37 and 38 toward glass 22.

Mounted in the bottom of box 17 adjacent rheostats 29 and 30 is a three positioned toggle switch 39, the hand control of which extends outwardly from box 17. When switch 39 is in the center position, it is turned off and none of the light bulbs will operate. When switch 39 is in the upper position, an electric circuit is closed through switch 39 to light bulbs 27 and 28 and rheostats 29 and 30. When switch 39 is in the lower position, an electric circuit is closed through switch 39 to the outside light bulbs 37 and 38 and rheostats 29 and 30.

Positioned directly in front of plate 22 of box 17 is a headpiece 40, which has two lens openings 41 and 42 corresponding in size and position to the human eyes. Headpiece 40 is removably attached by means of a wing nut 43 to a plate 44, which is attached to three shafts 45, 46 and 47. The outer shafts 45 and 47 are round and extend into the interior of box 17. Center shaft 46 likewise extends into the interior of box 17, but is square in shape, with gear teeth extending along its bottom edge.

A headpiece control rod 48 extends into box 17 from one side thereof transversely to shafts 45, 46 and 47. Mounted on control rod 48 is a round gear 49, which engages the teeth on the bottom edge of center shaft 46. A knurled hand control member 50 is attached to the outer end of control rod 48. Hand control member 50 is used to regulate the distance between headpiece 40 and box 17. When hand control member 50 is turned, it causes gear 49 to turn, thus moving center shaft 46 and headpiece 40 toward or away from box 17.

Mounted on the outside of box 17 surrounding control rod 48 is a circular distance chart 51 having three sets of dial markings. The outer set of markings is in diopters, to indicate the power of the light which reaches the eyes. The middle set is in inches, to indicate the apparent distance of the target from the lens and the inner set is in millimeters to indicate the actual distance of the target from the lens. Mounted above circular distance chart 51 is a transparent plastic indicator 52, which extends over chart 51 and has a line which marks the setting at any given time.

Extending along the entire front edge of box 17 adjacent plate 22 is a trough 53, which is adapted to hold stereographs or targets which are stereoscopic pictures or patterns used in visual training.

Mounted on base 10 is the timing mechanism of my device, the principal element of which is the timing control plate 54. Plate 54 is preferably made of engraver's brass. Through the use of a silk screen or lithographing process, it is etched with a design. This design is superimposed with asphalt paint, which is impervious to acid and all portions of the plate not so covered are etched with acid to a depth of 7/1000 inch. The design of timing control plate when so etched comprises a plurality of concentric circular paths on which the high and low spots correspond to desired lighting sequences.

Timing control plate 54 is rotatably mounted on a center shaft and is provided with gear teeth along its entire circumference. A synchronous motor 55 is mounted on base 10 adjacent timing control plate 54. Motor 55 operates at 18 R. P. M. and is geared through reduction gearing to turn timing control plate at 1 R. P. M.

Adjacent timing control plate 54 is a vertical shaft 56, on which are pivotally mounted a pair of U-shaped arms 57 and 58. The upper portions of arms 57 and 58 extend above plate 54 and their lower portions beneath plate 54. Mounted on the upper portions of arms 57 and 58 are a pair of rolling action snap switches 59 and 60. Switches 59 and 60 have ball pointed contacts 61 and 62, which are pointed downwardly to contact plate 54. Switches 59 and 60 are normally in closed position, but when contacts 61 and 62 are moved upwardly from 1/1000 to 2/1000 inch by the raised portions of the circular paths on plate 54, the switches open with a snap action.

Because the positioning of timing control plate 54 with respect to switches 59 and 60 is important for the proper operation of the switches, plate 54 is mounted on three ball bearings. One ball bearing is mounted on the lower portion of each of U-shaped arms 57 and 58, so that it contacts the lower surface of timing control plate 54. This makes the positioning of timing control plate 54 with respect to contacts 61 and 62 of switches 59 and 60 uniform at all times. A third ball bearing is mounted beneath the opposite side of timing control plate 54 for proper balance. The ball bearings which are held by arms 57 and 58 are adjustable from the bottom of base 10 to control their height.

Attached to the upper portions of arms 57 and 58 are a pair of timing control rods 63 and 64, which extend across plate 54 to project outwardly through openings which extend along one side of base 10. Adjacent these openings is a chart 65, which has a series of grooves along its upper and lower edges, with lettered markings corresponding thereto. The letters on the top of the chart extend from A to Q when read from left to right and those on the bottom are in the opposite order.

Timing control rods 63 and 64 may be moved transversely to rest in any of the grooves in chart 65. Rods 63 and 64 are slightly bent, one downwardly and one upwardly, so that they will remain under slight tension in the grooves in which they are placed. The top of chart 65 is marked O. D. at one end and Right at the other end, to indicate that its corresponding timing control rod 63 controls the lighting in the right hand compartment of box 17, which is viewed with the right eye. The bottom of chart 65 is marked O. S. at one end and Left at the other end, to indicate that its corresponding rod 64 controls the lighting in the left hand compartment of box 17, which is viewed with the left eye.

A three-position toggle switch 66 is mounted in base 10, with its control projecting outwardly therefrom adjacent chart 65. When switch 66 is in its center position, all parts of my device are turned off. When switch 66 is in its upper position, marked Lights, the light bulbs 27 and 28 or 37 and 38 may be used, as selected by switch 39. When switch 66 is in its lower position, marked Motor Lights, both the lights and synchronous motor 55 are placed in operation.

Mounted in the lower portion of base 10 is a four-position selector switch 67 which has a control member 68 extending outwardly through an opening in the side of base 10. Control member 68 may be moved horizontally to any of four positions marked as Normal, Transposed, Simultaneous Left and Simultaneous Right.

The grooves which are etched in plate 54 comprise a series of timing sequences which are used in visual training. There are a total of seventeen different sequences available, corresponding to the letters A to Q. A timing chart 69, which is attached to the front of pedestal 11, shows the exact timing and pattern of each sequence. The grooves on chart 65 into which timing control rods 63 and 64 are fitted are so spaced that rods 63 and 64 may only be placed in alternate paths on plate 54. Plate 54 thus has a total of thirty four concentric circular paths.

Additional variations in the timing duration and sequences may be obtained through the use of selector switch 67. When switch 67 is in normal position, the timing sequence will be that selected by the placing of timing control rods 63 and 64 exactly as shown on timing chart 69. When switch 67 is in transposed position, the timing sequence will be exactly the opposite of that which is shown on timing chart 69. In other words, the lighting for the left eye will be that shown on the chart for the right eye and vice versa. When switch 67 is in simultaneous left position, the timing sequence for both eyes will be that for which the left timing control rod is set as shown on chart 69 and the flashing of the lights will be simultaneous for both the left and right eyes. When switch 67 is in simultaneous right position, the timing sequence will be that for which the right timing control rod is set and the flashing will be simultaneous for both eyes.

In order that my device may be used for types of visual training where controlled sequence of lumination to either or both eyes is necessary. I provide a hood 70, which is adapted to be removably inserted between headpiece 40 and box 17.

Hood 70 comprises a pair of rectangular chambers. The bottom of hood 70 is provided with apertures which fit over light holders 33 and 34, so that light from bulbs 37 and 38 is not blocked when hood 70 is in place.

The bottom of hood 70 is also provided with a pair of small holes 71 and 72 which are adapted to fit over a pair of pins 73 and 74, which are positioned in front of glass 22, between light holders 33 and 34.

In use, hood 70 is installed by moving headpiece 40 away from box 17 and then fitting holes 71 and 72 over pins 73 and 74.

Headpiece 40 is then moved toward box 17 by means of control 48. Hood 70 is slightly smaller in its outer dimensions than headpiece 40 and is adapted to slide within headpiece 40, the interior of it is provided with small pieces of felt to minimize friction.

In operation, hood 70 provides a closed chamber leading from each eye to the sources of light, so that all extraneous light is excluded and the amounts, frequency and duration of light reaching each eye can be separately controlled.

Hood 70 is adapted to slide within headpiece 40 for one to two inches, to permit a variation in the distance setting of headpiece 40 from box 17. Since some types of visual training targets now in use require that the eyes be a shorter distance from the target, I also provide a second hood which is identical in construction, installation and function with hood 70 except that it is of shorter length. Instead of two separate hoods, I may also provide one collapsible or variable length hood.

In other types of visual training, it is necessary for the patient to have access to glass 22 for the purpose of using the hands in making drawings or tracing patterns. For this type of training I provide a septum 75, one end of which is U-shaped and is adapted to be removably fitted by friction grip around a center piece 76, which is vertically positioned on the inside of headpiece 40. Septum 75 assures that each eye can see only one half of glass 22 or one half of a target.

In order to maintain headpiece 40 from undesired movement toward or away from box 17 once it has been set at the desired distance, I provide a shaft locking device comprising a lock rod 77, which is screw threaded through the side of box 17, extending transversely to contact the side of shaft 45. Lock rod 77 has a manually operated lock control 78, which may be turned to tighten it against shaft 45. When tightened, the frictional engagement of the end of lock rod 77 against the side of shaft 45 prevents the movement of shaft 45 and thus prevents any accidental change in the distance between headpiece 40 and box 17. In use, lock control 78 should be loosened before and tightened after each change is made in the positioning of headpiece 40.

The front of headpiece 40 is provided at its center with a circular forehead rest 79, which is positioned above and between lens openings 41 and 42 to properly position the head and eyes of the patient.

Surrounding lens openings 41 and 42 are a pair of lens holders 80 and 81 which are semi-circular in shape, each of which is provided with three concentric grooves for holding up to three lenses. A pair of spring wire lens guards 82 and 83 are attached to headpiece 40 between lens holders 80 and 81 to guard the lenses from accidental displacement.

Positioned adjacent lens openings 41 and 42 opposite lens holders 80 and 81 are a pair of semicircular charts 84 and 85 which are marked in mm. with figures starting at 95 at their lower ends and continuing to 35 at their upper ends.

Furnished with my device are two lenses 86 and 87, one right and one left, plano convex +5.00 diopters, with their optical centers 18 mm. from their geometric centers. Lenses 86 and 87 are mounted in circular metallic rings 88 and 89, which have outwardly extending lens handles 90 and 91. Lens handles 90 and 91 are offset 27°16′ from the optical center.

When lenses 86 and 87 are mounted in lens holders 80 and 81, they are rotatable within the grooves. Lens handles 90 and 91 overlap semicircular charts 84 and 85 and are used as pointers to indicate the setting of the lenses.

Targets which are made for stereographic instruments have double views, one for each eye. The distance from one point on one picture to the same point on the other picture is called the separation of the target. The lenses of my device are adapted to be set for any separation from 35 to 95 mm. and thus can be used with any stereoscopic targets now in use.

It should be noted that the lens separation in my device is variable without actualy moving the lenses themselves closer together or farther apart. This is accomplished by the use of rotatable lenses having offset optical centers.

As the lenses 86 and 87 are turned in lens holders 80 and 81, vertical and horizontal prismatic powers are formed as vector components of the prismatic difference from the geometric centers of the lenses to the optical centers. Since the vertical prismatic vectors are both in the same direction, their effect is cancelled. The horizontal vectors, however, are in opposite directions and are therefore additive.

Semi-circular charts 84 and 85 are calibrated to show the lens separation when both lens holders 90 and 91 are set at the same position. If desired, vertical prismatic effects can be introduced by setting lenses 86 and 87 for different positions on charts 84 and 85. It is also possible, by setting the lens separation at a different amount than the target separation to obtain base in or base out prismatic effect.

As previously stated, my device can be used with any type of target and for any type of visual training now in use. The uses of my device will be briefly summarized.

My device may be used with Telebinocular-type targets such as skills cards by setting lenses 86 and 87 to 95 mm. separation on charts 84 and 85. Septum 75 is inserted and front lights 37 and 38 are used. Headpiece 40 may be set at any desired distance from box 17.

My device may be used with Tel-Eye-Trainer-type targets by again setting lenses 86 and 87 to 95 mm. separation and using front lights 37 and 38. A long hood 70 should be used for distance techniques and a shorter hood for intermediate or near points techniques.

My device may be used with Lange-type targets by setting the lenses 86 and 87 to 77 mm. separation for targets with this standard separation or 80-82 mm. with this separation. Hood 70 should be used and headpiece 40 moved to infinity setting on circular distance chart 51. The back light bulbs 27 and 28 should be used.

My device may be used with Cheiroscope-type targets or for Cheiroscopic drawings by setting the lenses to 85 mm. separation. Septum 75 should be used and box 17 tilted upwardly to a comfortable drawing position. Either light bulbs 37 and 38 or light bulbs 27 and 28 may be used. Where gross suppressions are found, it is desirable to use light bulbs 27 and 28 as transilluminators in drawing, since the illumination can be cut down on the non-suppression eye and left bright before the suppressing eye.

My device may be used with Peckham-type targets by removing headpiece 40, turning shafts 45, 46 and 47 all the way toward box 17 and using back lights 27 and 28. Selector switch 67 should be set to Simultaneous Left or Simultaneous Right position.

My device may be used with Vectoluminator-type targets or as a Flash Box by removing headpiece 40, turning shafts 45, 46 and 47 all the way in and using back light bulbs 27 and 28. My device may be used as a Tracing Box in the same way and by tilting box 17 to a compartable tracing angle.

In order that the timing control mechanism of my device may be used with other visual training instruments, I provide a pair of three-wire sockets, 92 and 93, which are mounted on the rear of base 10. The timing control mechanism of my device may thus be used to operate other instruments or to operate other instruments at the same time that my device is in use.

Having thus described my invention, I claim:

1. In a visual training device, means for controlling the flashing of electric lights comprising a rotatably mounted circular plate having a plurality of concentric paths thereon, each of said paths comprising a plurality of spaced depressions, a pair of arms pivotally mounted on a shaft adjacent said plate, said arms extending over said plate, a snap action switch mounted on each of said arms above said plate, said snap action switches adapted upon rotation of said plate to be caused to open and close by the spaced depressions in said plate, and a control rod attached to each of said arms, said control rods manually operable to move each of said arms so that the snap action switch thereof is controlled by any of the paths on said plate, one of said rods and arms controlling the sequence of lumination for the left eye and the other of said rods controlling the sequence of lumination for the right eye.

2. In a visual training device, means for controlling the flashing of electric lights comprising a rotatably mounted circular plate having a plurality of concentric paths thereon, each of said paths comprising a plurality of spaced depressions, a pair of arms pivotally mounted on a shaft adjacent said plate, said arms extending over said plate, a snap action switch mounted on each of said arms above said plate, said snap action switches adapted upon rotation of said plate to be caused to open and close by the spaced depressions in said plate, a control rod attached to each of said arms, said control rod manually operable to move each of said arms so that the snap action switch thereof is controlled by any of the paths on said plate, one of said rods and arms controlling the sequence of lumination for the left eye, the other of said rods and arms controlling the sequence of lumination for the right eye, and switch means adapted to transpose each of said sequences of lumination to the opposite eye and to provide simultaneously for both eyes the sequence of lumination for which either of said rods and arms is set.

3. A control device for electrical impulses comprising a substantially flat circular plate made of engraver's brass, said plate having a design superimposed thereon through a silk screen or lithographic process, said design formed of asphalt paint which is impervious to acid, said plate having said design etched thereon through the application of acid to said plate, so that the portions of said plate not covered with asphalt paint are etched to a depth of substantially $7/1000$ inch, said design forming a plurality of paths of raised and depressed portions on the surface of said plate, said portions adapted to cause the operating members of electrical switches to be moved upwardly and downwardly for the control of electrical impulses in desired sequences.

CHARLES W. OTT.

References Cited in the file of this patent

UNITED STATES PATENTS

| Number | Name | Date |
| --- | --- | --- |
| 1,090,816 | Henschel | Mar. 17, 1914 |
| 1,221,091 | Richard | Apr. 3, 1917 |
| 1,800,446 | Frank | Apr. 14, 1931 |
| 2,003,852 | Beattie | June 4, 1935 |
| 2,055,031 | Hutchings | Sept. 22, 1936 |
| 2,491,242 | Alexander | Dec. 13, 1949 |
| 2,505,340 | Poslusny | Apr. 25, 1950 |
| 2,524,338 | Ylinen | Oct. 3, 1950 |
| 2,573,405 | Clark | Oct. 30, 1951 |